March 8, 1955  L. S. OVERTON  2,703,654

DISCHARGE MECHANISM FOR VACUUM DRIERS

Original Filed Sept. 3, 1948

Inventor:
Lyle S. Overton
by Hill Sherman Meroni Gross & Simpson
Attys weight of the material in the bottom hopper 18.
As in the case of the valve 25, the valve 29 does not
United States Patent Office 2,703,654
Patented Mar. 8, 1955

2,703,654

DISCHARGE MECHANISM FOR VACUUM DRIERS

Lyle S. Overton, Dowagiac, Mich., assignor to Overton Machine Company, Dowagiac, Mich., a corporation of Michigan Original application September 3, 1948, Serial No. 47,649. Divided and this application January 9, 1952, Serial No. 265,589

1 Claim. (Cl. 214—17)

This invention relates to apparatus for unloading vacuum driers without loss of vacuum. Specifically, this invention deals with a device for discharging to the atmosphere batches of material dried by a vacuum drier without breaking the vacuum of the drier and without piling up dried material in the drier.

This application is a division of my copending application, Serial No. 47,649, filed September 3, 1948, now Patent No. 2,602,498, entitled "Evacuated Drum Drying Machine."

In accordance with this invention, an evacuated gas-tight receptacle with drum driers therein has a conveyor discharging the dried materials to the outside of the gas-tight receptacle without loss of vacuum and without requiring an added discharging force. The discharge mechanism or unloader of the present invention has superimposed chambers each discharging through an aperture in the bottom thereof which is controlled by a valve plug. Each valve plug is controlled from outside of the chambers and is held in closed position by vacuum within the chambers. The upper chamber receives material directly from the gas-tight receptacle. The lower chamber is equipped with vacuum and air vent controls. In operation, the top chamber is closed by its plug valve and assumes the pressure of the gas-tight receptacle. As this top chamber is being filled, the bottom chamber is dumped and then evacuated. When the top chamber is to be dumped, the bottom chamber is then evacuated at least as much as the top chamber, so that the top valve can easily be opened and the material in the top chamber discharged under the influence of gravity into the bottom chamber.

A feature of the invention resides in the provision of valve plugs coacting with their valve seats to provide gas-tight seals without, however, supporting the entire weight of the material in the chambers.

It is, then, an object of this invention to provide a discharge mechanism for evacuated apparatus which will unload the apparatus without breaking the vacuum therein.

Another object of the invention is to provide an inexpensive unloader for evacuated drying machines which will operate under the influence of gravity without breaking the vacuum in the drier apparatus and without requiring an additional outside discharging force.

Another object of the invention is to provide an unloader for a sealed apparatus which discharges under the influence of gravity and is controlled by plug valves effectively maintaining seals without supporting an appreciable weight of the material.

Other and further objects of the invention will be apparent to those skilled in the art from the following detailed description of the annexed sheet of drawings which, by way of a preferred example only, illustrates one embodiment of the invention.

Figure 1:
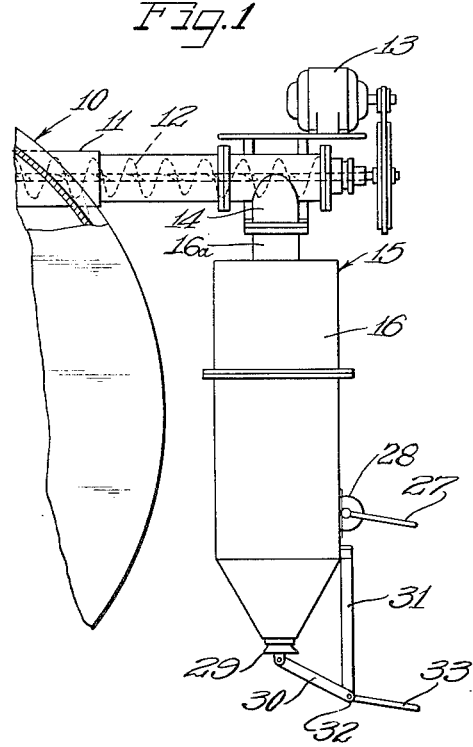
Figure 1 is a fragmentary transverse cross-sectional view, with parts in end elevation, of the discharge mechanism of this invention mounted on the outside of a gas-tight receptacle for receiving material therefrom.

In Figure 1, the reference numeral 10 designates generally a gas-tight receptacle containing drum drying apparatus (not shown) for supplying material dried under vacuum to a tubular discharge conduit 11 extending laterally outward from the upper portion of the receptacle and having a screw type conveyor 12 rotatably mounted therein for moving the dried material laterally outward from the receptacle. The conveyor 12 is driven by a motor 13 mounted on top of the tubular conduit 11. A depending conduit 14 on the tubular conduit 11 receives the material from the conveyor 12.

The unloader 15 of this invention is a generally cylindrical upstanding tank 16 with a collar 16a on the top end thereof mating with the conduit 14.

Figure 2:
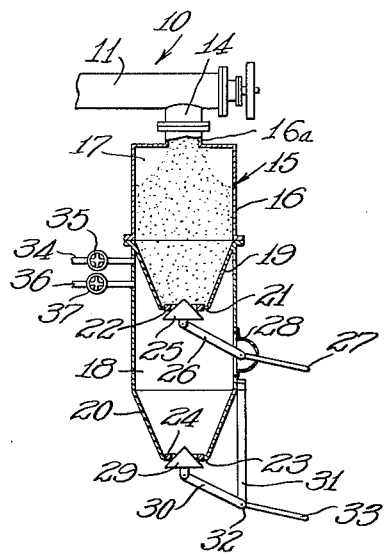
Figure 2 is a cross-sectional view of the discharge device, with parts in end elevation, illustrating the initial filling operation.
Figure 3:
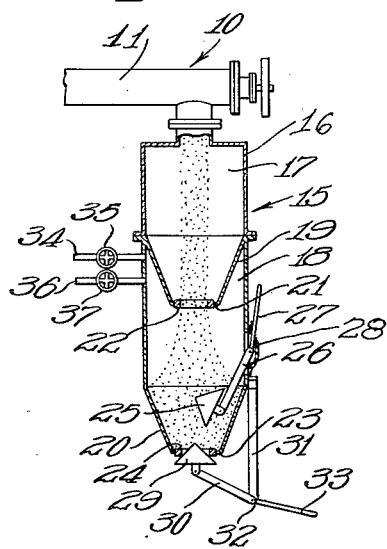
Figure 3 is a view similar to Figure 2 but illustrating the transfer operation of the unloader.
Figure 4:
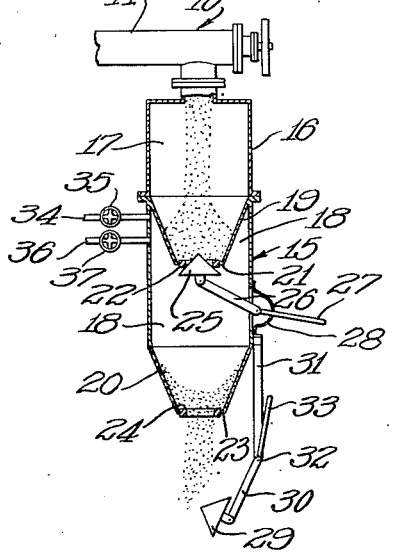
Figure 4 is a view similar to Figure 3 but illustrating the discharging position of the unloader.

As best shown in Figures 2 to 4, the cylindrical tank 16 is composed of two superimposed hopper portions 17 and 18 with the top hopper discharging through an inverted frusto-conical bottom portion 19 into the bottom hopper and with the bottom hopper discharging through an inverted frusto-conical bottom portion 20 into the atmosphere. The frusto-conical portion 19 has a horizontal apertured end wall 21 carrying a resilient seal ring 22 around the aperture thereof. A similar horizontal bottom wall 23 is provided at the apex end of the frusto-conical portion 20, and a similar resilient seal ring 24 is provided around the aperture.

A conical valve plug 25 has the apex end thereof freely fitting through the aperture provided by the seal ring 22, and the base end thereof larger than the opening in the seal ring so as to wedge the plug in the seal ring intermediate the apex and base ends of the plug. The plug 25 is pivoted on a lever 26 which is swung by a handle 27 on the outside of the hopper portion 18. A sealing boot 28 permits swinging of the lever 26 without opening up a gap in the hopper 18.

The aperture provided by the seal ring 24 in the bottom hopper portion 18 is closed by a conical plug valve 29 identical with the valve 25 and pivoted on a lever 30 identical with the lever 26. The lever 30 is pivoted on a depending bracket 31 on the tank 16 and a pivot 32 connects the lever 30 with an operating handle 33 in the same manner in which the handle 27 is connected to the lever 26.

A conduit 34 joined with the interior of the receptacle 10 or with another source of vacuum communicates with the upper portion of the hopper 18 at a point above the bottom of the portion 19. A valve 35 in the conduit 34 controls flow through the conduit. A similar conduit 36 with a valve 37 is adapted to vent the hopper 18 to the air or to an inert gas, such as carbon dioxide or nitrogen.

The various operating positions of the unloader are shown in Figures 2 to 4. In Figure 2, the hopper 17 is under vacuum existing in the receptacle 10, while the hopper 18 is under atmospheric pressure. Vacuum in the hopper 17 plus the valve linkage holds the plug valve 25 is closed position. It will be understood that the vacuum in the hopper 17 tends to draw the conical plug tightly against its seat ring 22. Material from the conduit 11 is moved by the conveyor to the conduit 14, where it drops by gravity into the hopper 17. Since the plug valve 25 has its apex projecting into the hopper 17, the weight of the material is not completely supported by the valve, and the conical bottom 19 with its flat end 21 supports substantially all of the weight of the material.

In order to empty the hopper 17 without loss of vacuum from the receptacle 10, the valve 37 is closed and the valve 35 is opened to place the hopper 18 under vacuum. As the hopper 18 is evacuated, the plug valve 29 is drawn tightly against its seat 24 to seal the hopper 18. As soon as pressures on both sides of the plug valve 25 are substantially equal, the weight of the solid material in the hopper 17 will automatically force the plug valve 25 to open position, and the solid material flows downwardly under the influence of gravity into the bottom hopper 18 as best illustrated in Figure 3. Atmospheric pressure on the plug valve 29, plus the valve linkage, will hold the plug valve in sealed position against its seat 24 to support the weight of the material in the bottom hopper 18. As in the case of the valve 25, the valve 29 does not support the entire weight of the material, because the apex end of the valve projects into the material and the weight is distributed to the conical walls 20 and end wall 23 of the hopper 18.

When the hopper 17 is empty, the valve 25 is moved to closed position by actuation of the handle 27, the valve 35 is closed and the valve 37 is opened to bleed air or other gas into the hopper. The pressure of the air or inert gas in the hopper 18 then acts to maintain the plug valve 25 in closed position. At the same time, however, pressure on both sides of the hopper valve 29 will be equalized and the valve will automatically open under the influence of the weight of the solid material supported thereon. As shown in Figure 4, the material from the hopper 18 then discharges by gravity out of the bottom of the hopper. When the hopper 18 is emptied, the valve handle 33 is swung downwardly to close the valve 29 and the cycle is ready to be repeated.

The unloader of this invention intermittently discharges batches of material dried in the sealed receptacle 10 without ever breaking the vacuum in this receptacle. The evacuated apparatus may continually discharge its product, and the product may be intermittently removed with removal being accomplished under the action of gravity alone.

It will be understood that modifications and variations may be effected without departing from the scope of the novel concepts of the present invention.

I claim as my invention:

In an unloader having super-imposed hoppers, each of said hoppers having inverted frustoconical bottoms converging to narrow horizontal apertured end walls, means for evacuating both of said hoppers, and means for venting the bottom hopper to the atmosphere, the improvement which comprises providing resilient seal rings surrounding said apertures and said end walls, a conical plug valve for each of said apertures, said conical plug valve fitting partially through said seal ring with the apex of said conical valve disposed in the hopper closed by said valve, said valve thereby wedgedly engaging the seal rings for sealing contact, valve linkages connected to each of said plug valves, handles accessible from outside of said hoppers for operating said plug valves independently, said plug valves automatically opening under the weight influence of material in the hopper closed thereby when pressure on opposite sides thereof are substantially equal, and said conical plug valves being adapted to be held in tight sealing engagement with said seal rings by pressure differential when said valves are wedgedly engaged with said rings and the hopper closed by said valve is evacuated.

References Cited in the file of this patent

UNITED STATES PATENTS

| | | |
|---|---|---|
| 960,857 | Eggert | June 7, 1910 |
| 1,482,677 | Dunten | Feb. 5, 1924 |
| 1,668,987 | Smith | May 8, 1928 |
| 1,943,589 | Domina | Jan. 16, 1934 |
| 2,539,226 | Bierman | Jan. 23, 1951 |

FOREIGN PATENTS

| | | |
|---|---|---|
| 360,943 | Great Britain | Nov. 9, 1931 |